US008957328B2

(12) United States Patent
Rogers et al.

(10) Patent No.: US 8,957,328 B2
(45) Date of Patent: Feb. 17, 2015

(54) WEIGHT MONITORING SYSTEMS AND METHODS USING BIOMETRIC IDENTIFICATION INPUT DEVICES

(75) Inventors: Sharon D. Rogers, Greenville, NC (US); John Arthur Thomas Darrow, Greenville, NC (US)

(73) Assignee: East Carolina University, Greenville, NC (US)

( * ) Notice: Subject to any disclaimer, the term of this patent is extended or adjusted under 35 U.S.C. 154(b) by 219 days.

(21) Appl. No.: 13/427,462

(22) Filed: Mar. 22, 2012

(65) Prior Publication Data

US 2012/0241227 A1    Sep. 27, 2012

Related U.S. Application Data

(60) Provisional application No. 61/467,705, filed on Mar. 25, 2011.

(51) Int. Cl.
| | |
|---|---|
| *G01G 19/40* | (2006.01) |
| *A61B 10/00* | (2006.01) |
| *G06K 9/00* | (2006.01) |
| *G07D 7/00* | (2006.01) |
| *G06F 17/00* | (2006.01) |
| *G01G 19/44* | (2006.01) |
| *G01G 23/37* | (2006.01) |
| *G01G 23/42* | (2006.01) |

(52) U.S. Cl.
CPC ............ *G01G 19/44* (2013.01); *G01G 23/3735* (2013.01); *G01G 23/42* (2013.01); *Y10S 128/922* (2013.01)
USPC ....... 177/25.19; 177/245; 340/5.83; 128/922; 600/587; 600/300; 700/90; 702/172

(58) Field of Classification Search
USPC .............. 340/5.83; 177/25.19, 245; 128/920, 128/922; 600/587, 300; 702/173; 700/90
See application file for complete search history.

(56) References Cited

U.S. PATENT DOCUMENTS

| | | | |
|---|---|---|---|
| 4,113,039 A | | 9/1978 | Ozaki et al. |
| 4,301,879 A | | 11/1981 | Dubow |
| 4,366,873 A | | 1/1983 | Levy et al. |
| 4,831,242 A | | 5/1989 | Englehardt et al. |
| 5,071,168 A | * | 12/1991 | Shamos ........................ 283/117 |
| 5,229,764 A | | 7/1993 | Matchett et al. |
| 5,920,642 A | * | 7/1999 | Merjanian ..................... 382/126 |
| 6,038,465 A | * | 3/2000 | Melton, Jr. .................... 600/407 |
| 6,621,013 B2 | | 9/2003 | Tanida et al. |
| 6,635,015 B2 | | 10/2003 | Sagel |
| 6,765,470 B2 | * | 7/2004 | Shinzaki ...................... 340/5.52 |
| 6,809,270 B2 | | 10/2004 | Fujita |
| 6,975,961 B1 | | 12/2005 | Hong |
| 7,265,301 B2 | | 9/2007 | Simberg |

(Continued)

OTHER PUBLICATIONS

"NWCA Optimal Performance Calculator," Retrieved Mar. 12, 2012 from http://nwcaonline.com/performance/, 2 pages.

*Primary Examiner* — Randy W Gibson

(74) *Attorney, Agent, or Firm* — Myers Bigel Sibley & Sajovec, PA

(57) ABSTRACT

A weight monitoring system includes a biometric identification input device, a body weight scale, and a controller. The controller is operative to identify a subject using identification data acquired by the biometric identification input device, to store weight data for the subject acquired by the body weight scale, and to correlate the weight data with the subject.

13 Claims, 21 Drawing Sheets

(56) References Cited

U.S. PATENT DOCUMENTS

| | | |
|---|---|---|
| 7,541,547 B2 | 6/2009 | McGuire et al. |
| 7,705,735 B2 | 4/2010 | Pape et al. |
| 7,774,285 B2 | 8/2010 | Hu et al. |
| 7,779,268 B2 | 8/2010 | Draper et al. |
| 7,932,472 B2 | 4/2011 | Oseko |
| 8,087,937 B2 | 1/2012 | Peplinski et al. |
| 8,475,367 B1 * | 7/2013 | Yuen et al. .................... 600/300 |
| 2004/0044560 A1 | 3/2004 | Giglio et al. |
| 2004/0225533 A1 | 11/2004 | Cosentino et al. |
| 2004/0238228 A1 | 12/2004 | Montague et al. |
| 2007/0167286 A1 | 7/2007 | Roes |
| 2007/0195999 A1 | 8/2007 | Willis |
| 2008/0281222 A1 | 11/2008 | Fukada |
| 2009/0044987 A1 | 2/2009 | Taylor et al. |
| 2009/0057035 A1 | 3/2009 | Oseko |
| 2009/0118589 A1 | 5/2009 | Ueshima et al. |

* cited by examiner

WEIGHT MONITORING SYSTEMS AND METHODS USING BIOMETRIC IDENTIFICATION INPUT DEVICES

RELATED APPLICATION(S)

The present application claims the benefit of and priority from U.S. Provisional Patent Application No. 61/467,705, filed Mar. 25, 2011, the disclosure of which is hereby incorporated herein by reference in its entirety.

FIELD OF THE INVENTION

The present invention relates to weighing devices and, more particularly, to weight monitoring systems.

BACKGROUND OF THE INVENTION

It is often necessary or desirable to weight athletes to track and assess their condition or status. For example, members of an athletic team may be weighed before, during and/or after each practice to monitor their hydration.

SUMMARY OF THE INVENTION

According to some embodiments of the present invention, a weight monitoring system includes a biometric identification input device, a body weight scale, and a controller. The controller is operative to identify a subject using identification data acquired by the biometric identification input device, to store weight data for the subject acquired by the body weight scale, and to correlate the weight data with the subject.

In some embodiments, the controller is operative to automatically programmatically identify the subject using the identification data, store the weight data for the subject, and correlate the weight data with the subject.

According to some embodiments, the biometric identification input device includes a biometric scanner adapted to scan and read the subject's fingerprint.

In some embodiments, the controller is operative to store multiple weight values for each subject, and index each of the multiple weight values to a designated weigh-in time point.

According to some embodiments, the controller is operative to: programmatically analyze the weight data to identify subjects that satisfy a prescribed criteria; and report the identification(s) of the subject(s) satisfying the prescribed criteria.

According to some embodiments, the weight monitoring system includes a remote administrator terminal and/or an integrated human-machine interface.

The weight monitoring system may include a console, wherein the biometric identification input device, the body weight scale, and the controller are integrated with the console.

The weight monitoring system may further include a display.

According to some embodiments, the system includes an external server, and the controller is networked to the external server to enable the controller to export the weight data to the external server. In some embodiments, the external server is operated by a weight certification authority.

According to method embodiments of the present invention, a method for monitoring subjects' weights includes providing a weight monitoring system including: a biometric identification input device; a body weight scale; and a controller. The method further includes, using the controller, identifying a subject using identification data acquired by the biometric identification input device, storing weight data for the subject acquired by the body weight scale, and correlating the weight data with the subject.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
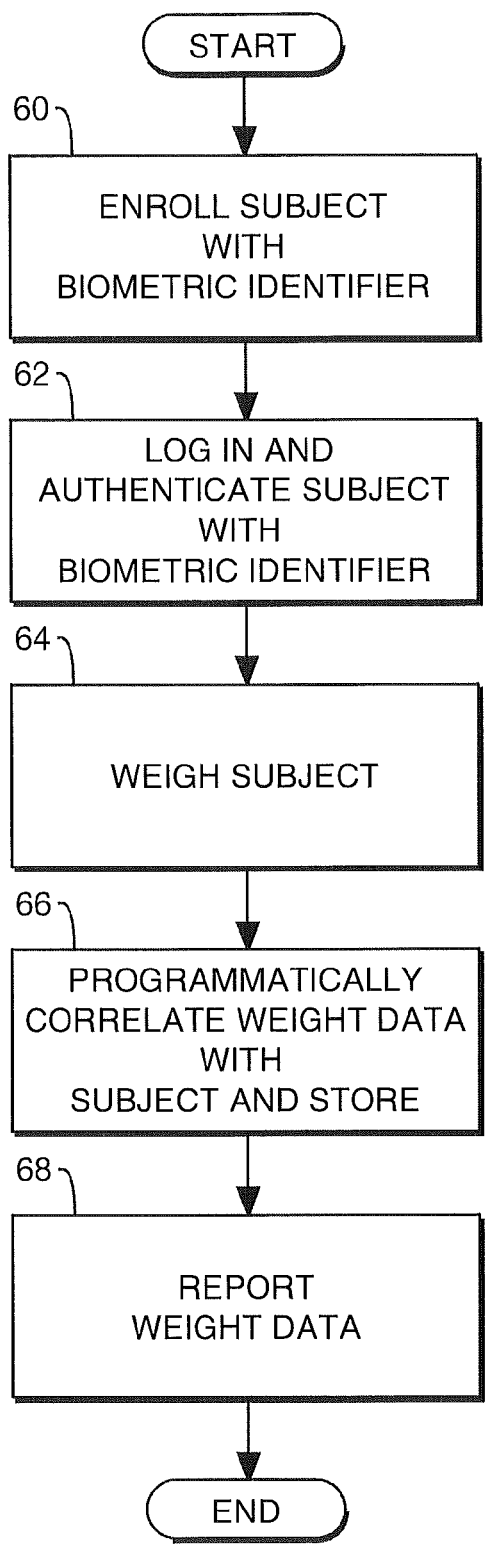
FIG. 1 is a flowchart representing methods for monitoring a subject's weight in accordance with methods of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention may take the form of an entirely software embodiment or an embodiment combining software and hardware aspects, all generally referred to herein as a "circuit" or "module." In some embodiments, the circuits include both software and hardware and the software is configured to work with specific hardware with known physical attributes and/or configurations. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or other storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on another computer, local and/or remote or entirely on the other local or remote computer. In the latter scenario, the other local or remote computer may be connected to the user's computer through a local area network (LAN) or a wide area network (WAN), or the connection may be made to an external computer (for example, through the Internet using an Internet Service Provider).

Embodiments are described in part below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams of certain of the figures herein illustrate exemplary architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order or two or more blocks may be combined, depending upon the functionality involved.

The term "automatically" means that the operation is substantially, and may be entirely, carried out without human or manual input, and can be programmatically directed or carried out.

The term "programmatically" refers to operations directed and/or primarily carried out electronically by computer program modules, code and/or instructions.

The term "electronically" includes both wireless and wired connections between components.

According to embodiments of the present invention, a weight monitoring system and methods for using the same are provided for efficiently and reliably collecting, recording and tracking the weights of subjects such as athletes. The apparatus includes a weight measuring scale and a biometric identification authentication device (biometric device) each operably connected to a controller (e.g., a microprocessor-based computer) having a memory. In use, each subject (e.g., athlete) is weighed on the scale and is scanned by the biometric device to positively identify the subject. The weight as measured by the scale is correlated with the subject and stored. In some embodiments, the apparatus enables and the method includes executing a plurality of weigh-ins as described at different times (which may be referred to herein as "time points") and reporting the measured weights for each time point in a manner that enables comparison between the measured weights of the subject over time.

With reference to FIG. 1, methods for monitoring the weight of a subject are represented therein. The subject is enrolled with a biometric identifier (Block 60). Thereafter, the subject logs into and is authenticated using the biometric identifier (Block 62). The subject is weighed on a scale and corresponding weight data is generated (Block 64). The subject's weight data is programmatically correlated with the subject and stored (Block 66). The stored weight data is reported (Block 68).

Figure 2:
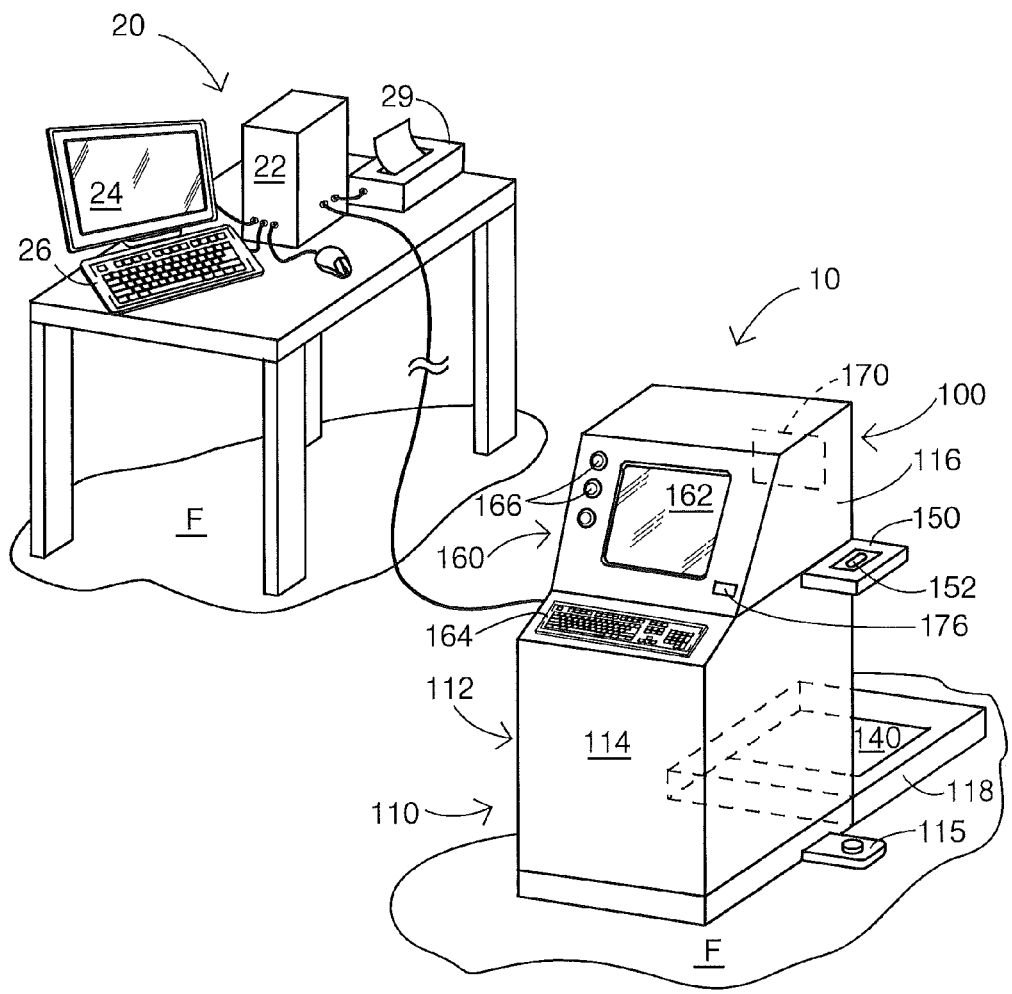
FIG. 2 is a front perspective view of a weight monitoring system according to embodiments of the present invention.
Figure 3:
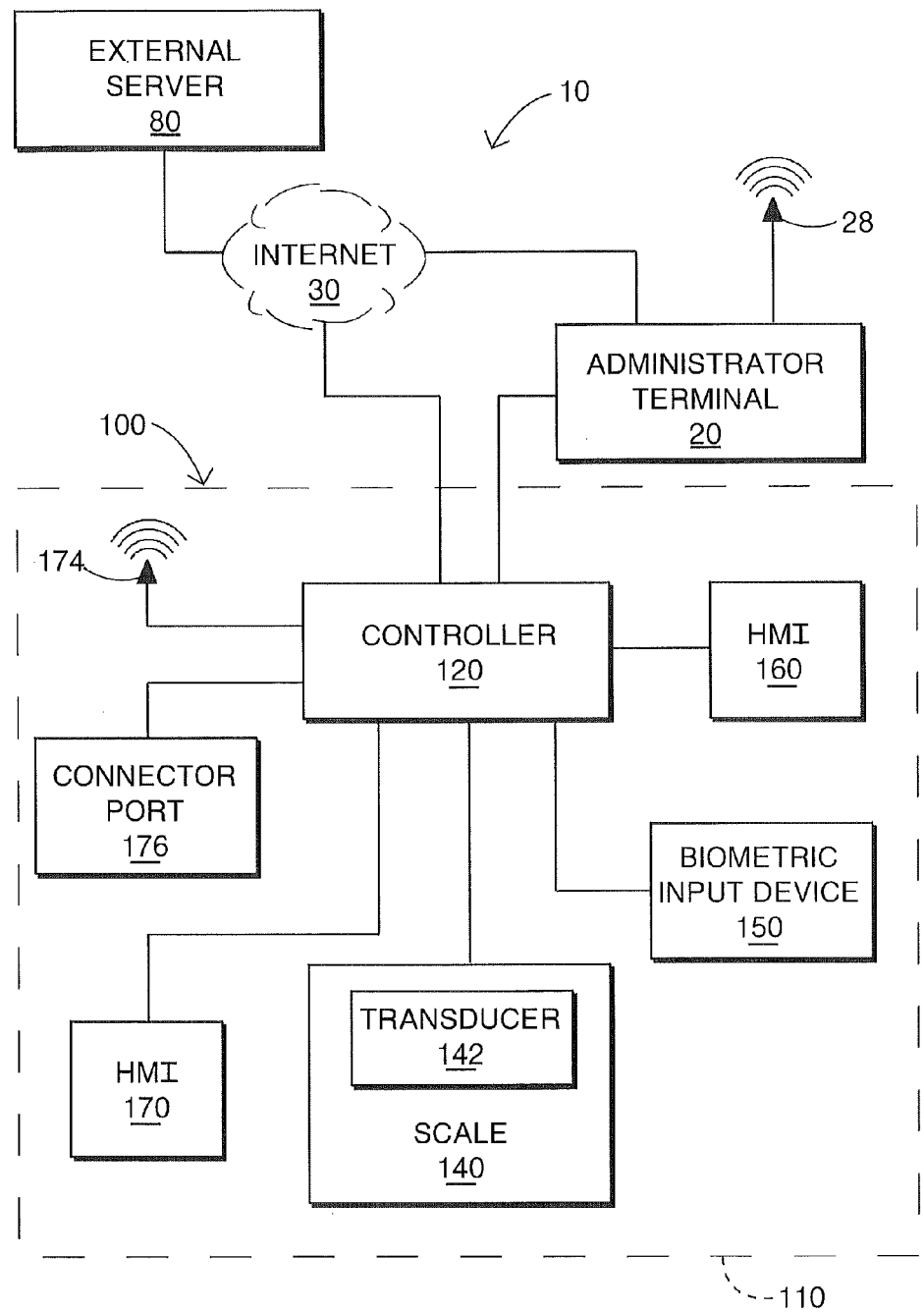
FIG. 3 is a schematic diagram representing the weight monitoring system of FIG. 1.
Figure 4:
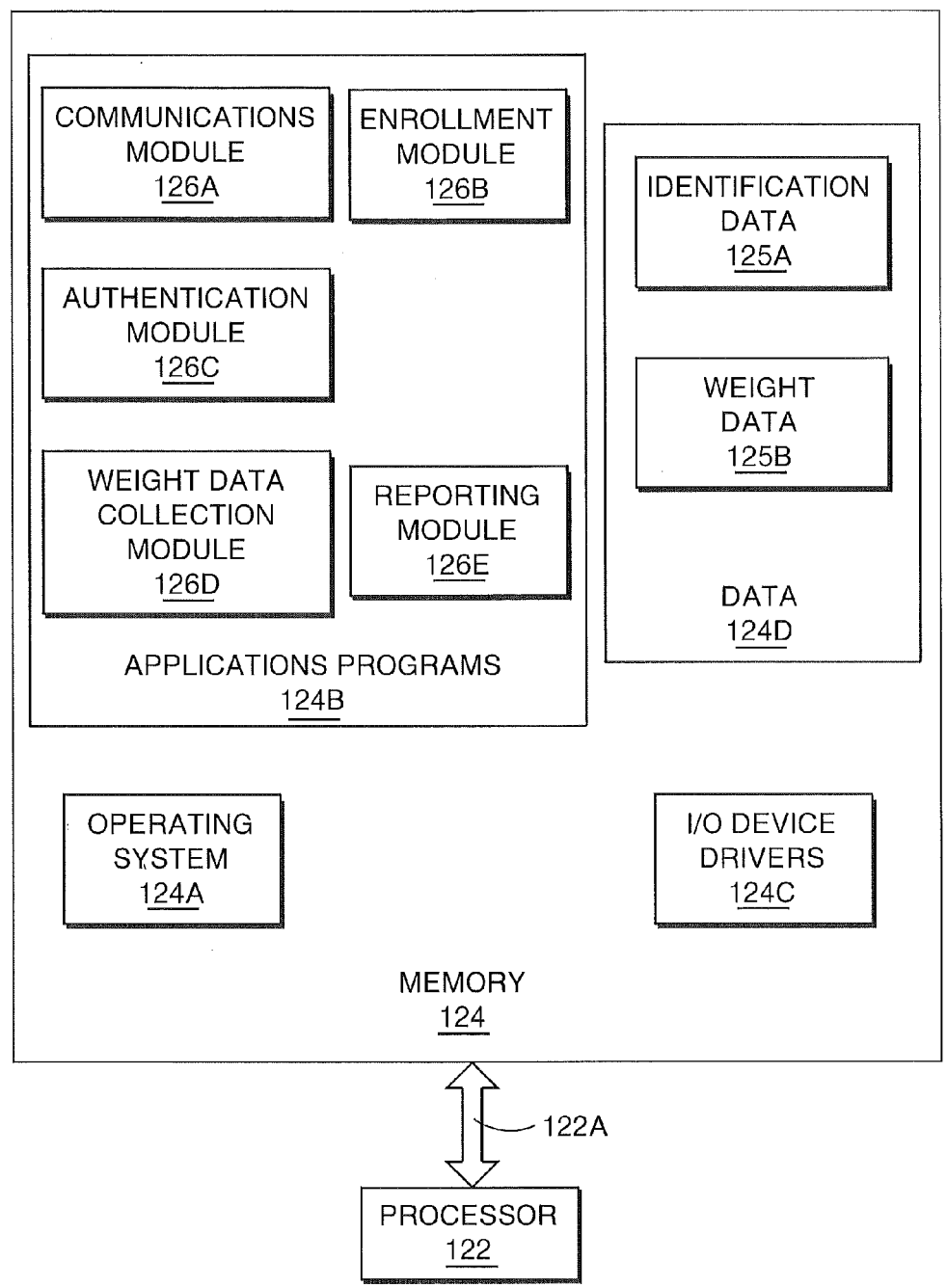
FIG. 4 is a schematic block diagram representing a data processing system of the weight monitoring system of FIG. 1.

With reference to FIGS. 2-4, a weight recording system 10 according to embodiments of the present invention is shown therein. The system 10 includes a weigh-in unit 100 and a remote administrator terminal 20.

The weigh-in unit 100 includes an upright kiosk, housing or console 110 on or in which are mounted a controller 120, a body weight scale 140, a biometric identification, input device 150, and a local administrator human-machine interface (HMI) 160. The weigh-in unit 100 is operatively connected to the remote administrator terminal 20, as discussed below.

The console 110 includes a sturdy cabinet 112 and a scale holder 118 (e.g., a low platform) integral with the cabinet 112. The cabinet 112 may include an anchor structure 115 (e.g., bracket) or other feature for securing the console 110 to a structure such as a floor F or wall. The cabinet 112 includes a base 114 supporting an HMI section 116 at a desired height above the ground.

The console 110 may be formed of any suitable material(s). According to some embodiments, the console 110 is waterproof or water-resistant to protect the controller 120 and other sensitive components mounted therein from the surrounding environment. According to some embodiments, the console 110 is reinforced or fortified to protect the controller 120 and other sensitive components mounted therein from impacts and/or deliberate tampering. According to some embodiments, the console 110 has an overall weight of at least 45 lbs.

The controller 120 may be any suitable device for providing the functionality described herein. According to some embodiments, the controller 120 is an appropriately configured microprocessor-based personal computer.

FIG. 4 is a schematic illustration of a circuit or data processing system that can be used in the controller 120. The circuits and/or data processing systems may be incorporated in a digital signal processor 122 in any suitable device or devices. The processor 124 communicates with the HMIs 160, 170, memory 124 and further external devices (as discussed hereinbelow) via an address/data bus 122A. The processor 122 can be any commercially available or custom microprocessor. The memory 124 is representative of the overall hierarchy of memory devices containing the software and data used to implement the functionality of the data processing system. The memory 124 can include, but is not limited to, the following types of devices: cache, ROM, PROM, EPROM, EEPROM, flash memory, SRAM, and DRAM.

FIG. 4 illustrates that the memory 124 may include several categories of software and data used in the data processing system: the operating system 124A; the application programs 124B; the input/output (I/O) device drivers 124C; and data 124D. The data 124D can include equipment-specific data. FIG. 4 also illustrates that the data 124D can include identification data 125A and weight data 125B. FIG. 4 also illustrates that application programs 125B can include a communications module 126A, an enrollment module 126C, an authentication module 126C, a weight data collection module 126D, and a reporting module module 126E.

As will be appreciated by those of skill in the art, the operating system 124A may be any operating system suitable for use with a data processing system, such as OS/2, AIX, DOS, OS/390 or System390 from International Business Machines Corporation, Armonk, N.Y., Windows CE, Windows NT, Windows95, Windows98, Windows2000 or other Windows versions from Microsoft Corporation, Redmond, Wash., Unix or Linux or FreeBSD, Palm OS from Palm, Inc., Mac OS from Apple Computer, LabView, or proprietary operating systems. The I/O device drivers 124C typically include software routines accessed through the operating system 124A by the application programs 124B to communicate with devices such as I/O data port(s), data storage and certain memory components. The application programs 124B are illustrative of the programs that implement the various features of the data processing system and can include at least one application, which supports operations according to embodiments of the present invention. Finally, the data 124D represents the static and dynamic data used by the application programs 124B, the operating system 124A, the I/O device drivers 124C, and other software programs that may reside in the memory 124.

As will be appreciated by those of skill in the art, other configurations may also be utilized while still benefiting from the teachings of the present invention. For example, one or more of the modules 126A-E may be incorporated into the operating system, the I/O device drivers or other such logical division of the data processing system. Thus, the present invention should not be construed as limited to the configuration of FIG. 4, which is intended to encompass any configuration capable of carrying out the operations described herein. Further, one or more of the modules can communicate with or be incorporated totally or partially in other components, such as the controller 120.

The controller 120 may be connected to a wireless transmitter 174 and a local external data communications connector 176 such as a USB port (FIG. 3).

The scale 140 may be any suitable scale operable to detect the weight of an object placed thereon (e.g., the subject) and generate a corresponding electronic signal representative of the detected weight. The scale 140 includes a weight sensor (e.g., transducer) 142.

The biometric identification input device 150 may be any suitable device operable to detect a biological feature of the subject. According to some embodiments, and as described herein, the biometric input device 150 is a biometric scanner adapted to scan and read a subject's fingerprint (which may include a thumbprint). However, it will be appreciated that other types of biometric identification input devices may be employed, such as a retinal scanner. Suitable biometric identification input devices include the USB Biometric Fingerprint Reader available from Hewlett-Packard.

The local administrator HMI 160 is integrated into the weigh-in unit 100 in the HMI section 116 of the console 110, for example. The local administrator HMI 160 may include any suitable input device(s) and output devices. The input devices may include, for example, a keyboard, mouse, touch screen (as illustrated), and/or touchpad. The output devices may include, for example, a visual display device and/or an audio speaker transducer. In the illustrated embodiment, the HMI 160 includes a touchscreen display 162, a keyboard 164, and indicator lights 166. The display 162 may be used to display one or more graphical user interfaces (GUIs).

The remote administrator terminal 20 (FIG. 2) may include a computer terminal 22 having a suitable controller. According to some embodiments, the computer terminal 22 is a conventional or suitable configured microprocessor-based personal computer. The administrator terminal 20 may include a display 24, input devices 26 (e.g., keyboard, mouse, touchscreen and/or touchpad), a wireless transmitter 28 (FIG. 3) and a printer 29.

As illustrated in FIG. 3, the controller 120 is connected for electronic communication with each of the scale 140, the biometric input device 150, the user HMI 160, the integrated administrator HMI 170, the wireless transmitter 174 and the local external connector 176. The controller 120 and the administrator terminal 20 may also be networked to communicate with one another via the Internet 30 or a local network (e.g., LAN). Communications between the controller 120 and these devices are enabled and managed by the communications module 126A.

Exemplary operation of the weight monitoring system 10 in accordance with embodiments of the invention will now be described. It will be appreciated that the screen shots as shown in the figures and described, as well as various other aspects, may be modified or supplemented.

While both a local administrator HMI 160 and a remote administrator terminal 20 are shown and described, either may be omitted in accordance with embodiments of the invention. Moreover, in the event that both are provided, the administrator(s) may use both for portions of the procedures described herein.

Initially, an administrator logs in to the system 100 using the terminal 20 or the HMI 160. The system 10 may require suitable security such as an administrator name and password to enable log in.

Figure 5:
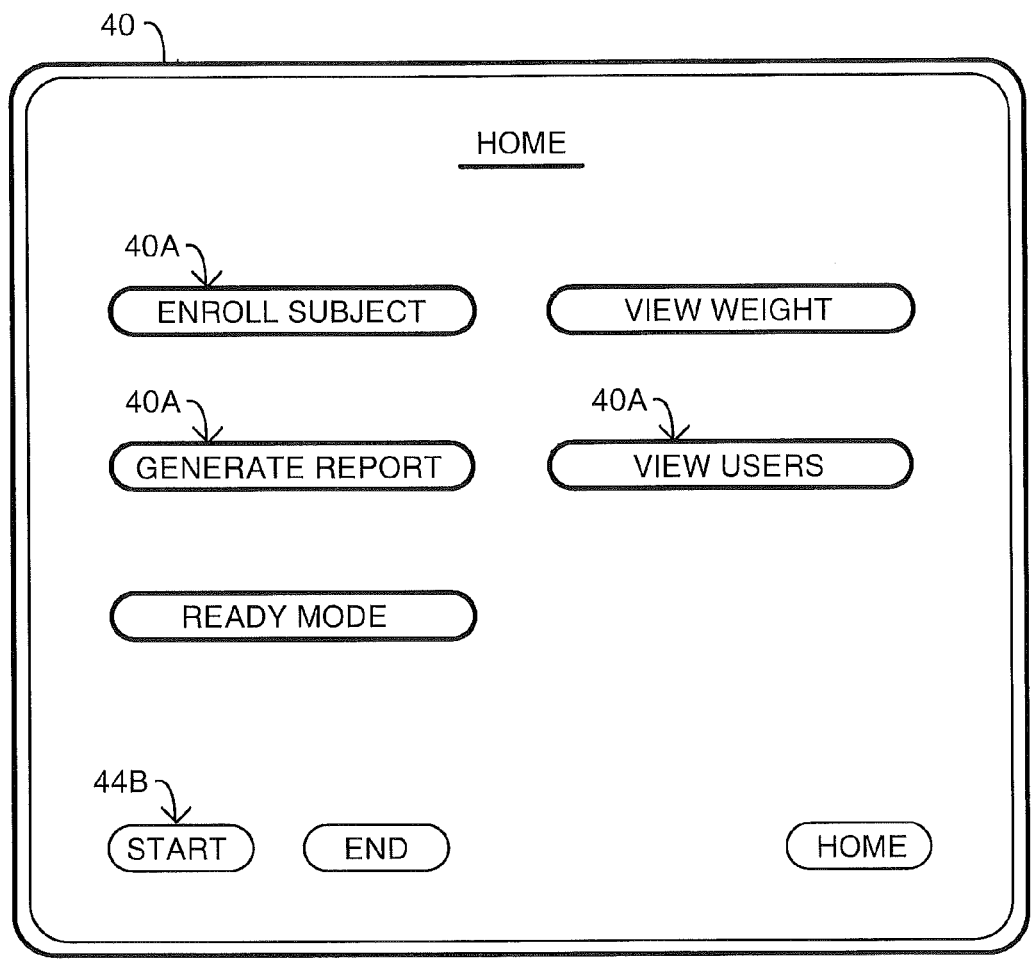
FIGS. 5-20 illustrate exemplary screen shots of a user interface of the weight monitoring system of FIG. 1.

A HOME screen 40 (FIG. 5) is displayed to the administrator on the terminal 20. The HOME screen provides the administrator with buttons 40A to select from the options of "ENROLL USER", "GENERATE REPORT", "READY MODE", "VIEW WEIGHT", and "VIEW USERS".

Figure 6:
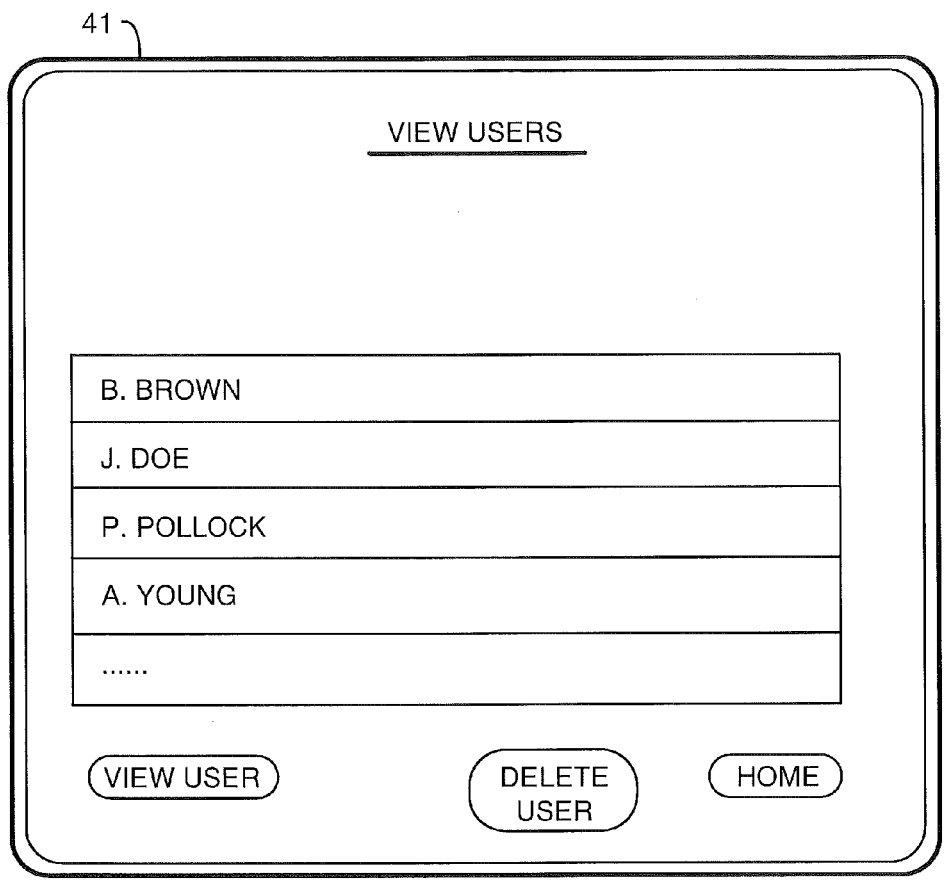
Figure 14:
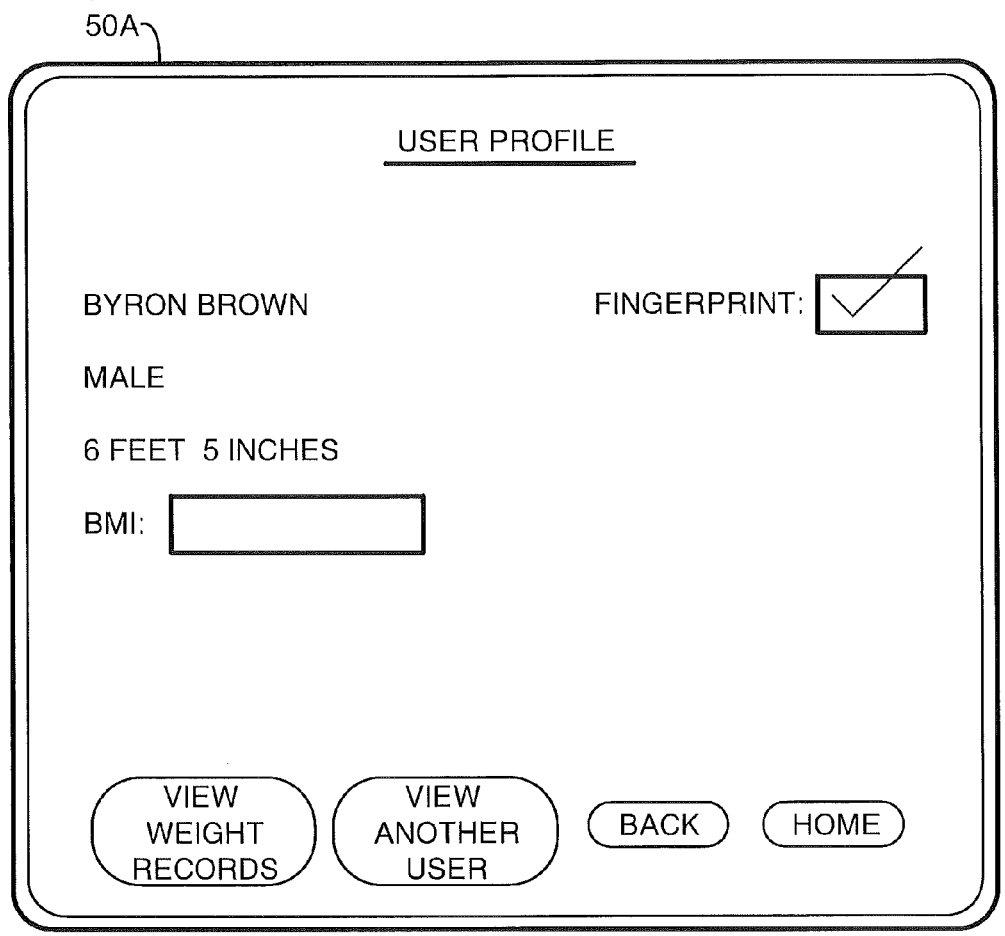

If it is desired to view currently enrolled users, the administrator selects the "VIEW USERS" button, responsive to which the controller 120 may generate a screen 41 as shown in FIG. 6. The administrator can view additional information relating to the selected user by highlighting the user and selecting "VIEW USER", responsive to which the controller 120 may generate a screen 50A as shown in FIG. 14.

If it is desired to enroll one or more subjects for weight tracking, the administrator selects the "ENROLL USER" button, which activates the enrollment module 126B. An ENROLLMENT screen 42 (FIG. 6) is displayed. The ENROLLMENT screen 42 may solicit entry of desired demographic and/or biographical information of the subject in data entry fields 42A. Additional biographical information may be solicited using drop down menus under the listed categories, for example. The subject places his/her finger on the biometric device 140 and the "SCAN" button is selected to initiate a biometric scan. According to some embodiments, the administrator enters the demographic/biographical information and initiates the scan using the terminal 20 or the HMI 160.

Figure 8:
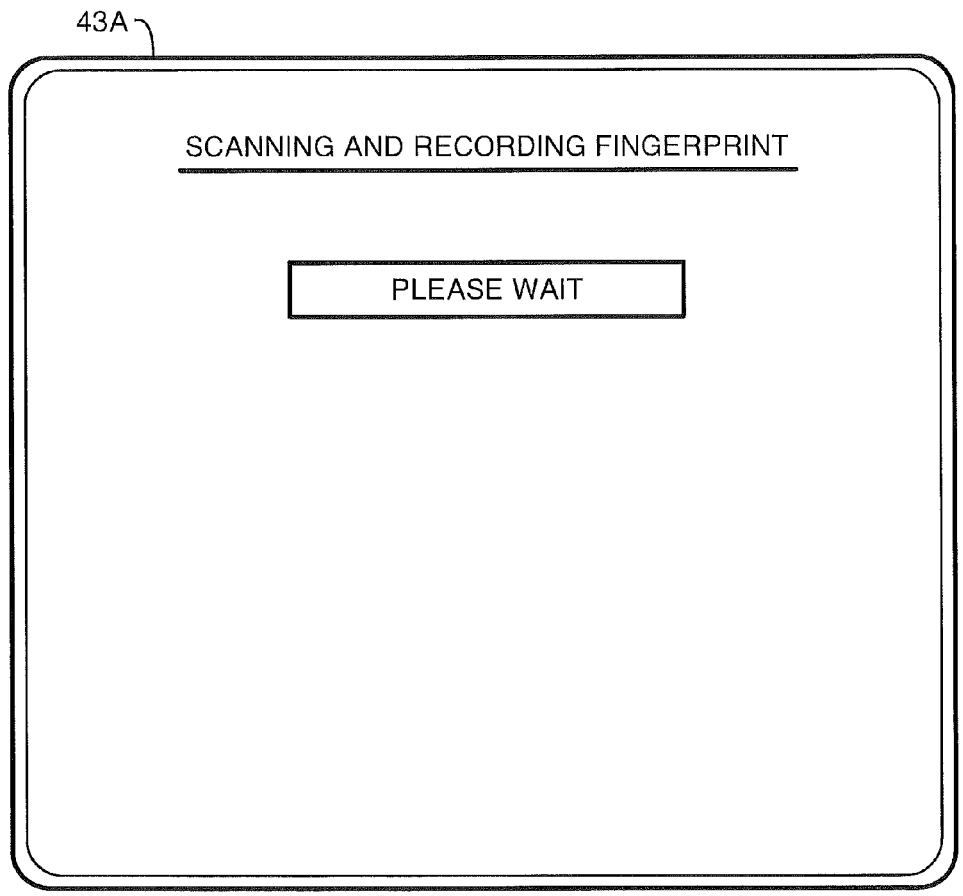

When the biometric scan is initiated, the subject places his or her finger on the sensor 152 and the scanner 150 acquires an image of the subject's finger print (or other targeted biological feature). A screen 43A as shown in FIG. 8 may be generated to indicate the scan is in progress. The image may be programmatically pre-processed to remove sensor artifacts and/or background noise, for example. Typically, features are programmatically extracted from the image and a template is automatically and programmatically created therefrom using a suitable algorithm.

Figure 9:
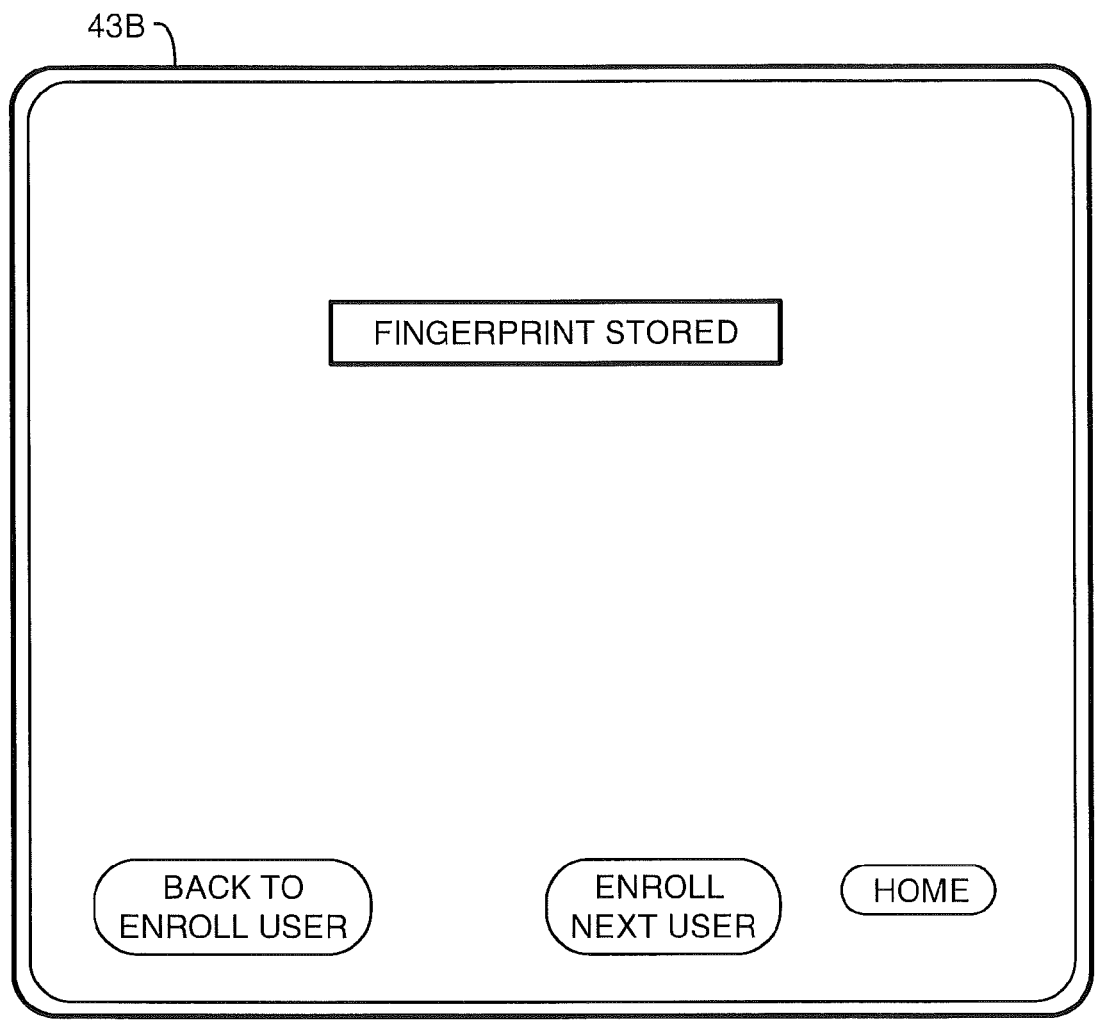

The template and the demographic/biographical information are each saved in the identification data 125A, where they are indexed and correlated with one another. More particularly, the biometric identification template is associated (i.e., correlated or indexed) with the subject in the stored identification data 125A. The subject is thereby registered and enrolled by the controller 120. The controller 120 may generate a screen 43B as shown in FIG. 9 to indicate to the administrator (e.g., via the terminal 20 or the HMI 160) that enrollment of the subject has been successfully completed.

The foregoing procedure can be repeated for each desired enrollee. New subjects can be enrolled at any time by returning the ENROLLMENT screen 42.

Figure 10:
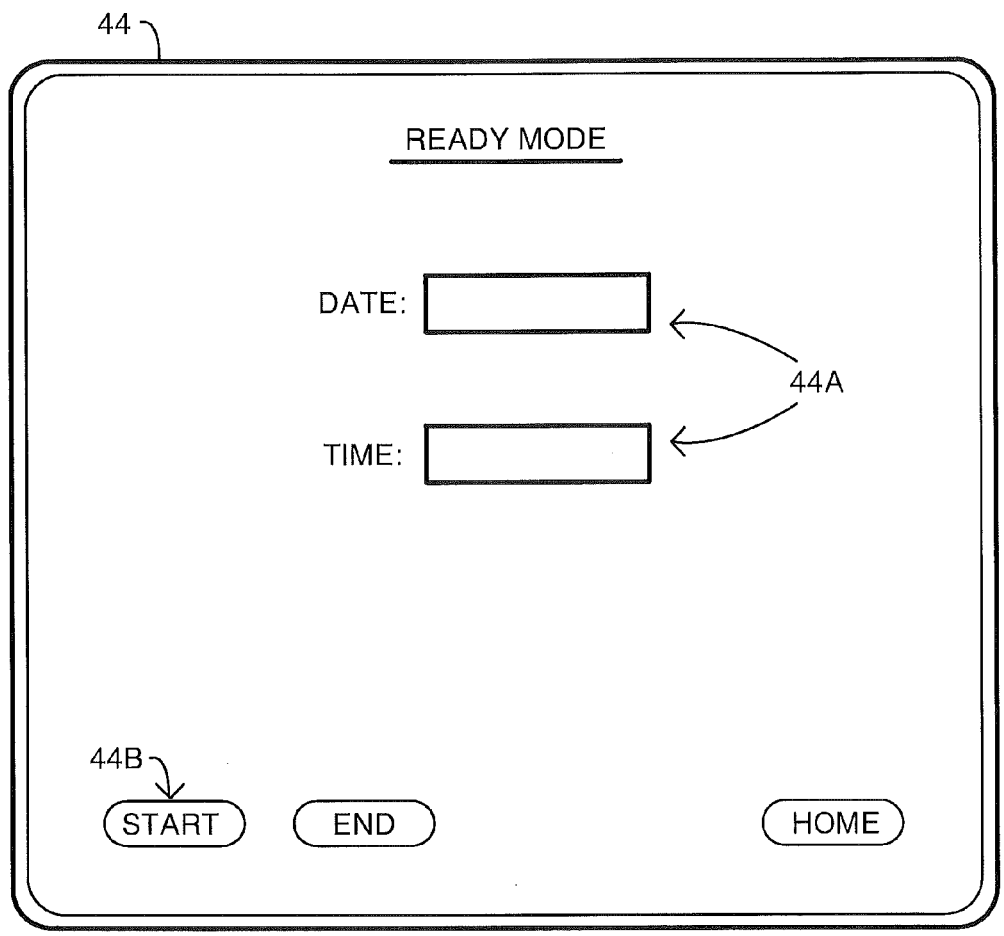

In order to initiate a weigh-in session, the administrator selects "READY MODE" from the HOME screen 40, responsive to which a READY MODE screen 44 (FIG. 10) is displayed on the terminal 20 or the HMI 160. Using the fields 44A, the administrator can set a designated time and date (i.e., time point) for the weigh-in for later reference. For example, the designated date and time may be the approximate start time for the desired weigh-in session. The administrator can then select the "START" button 44B to launch a weigh-in mode.

In the weigh-in mode, the authentication module 126C and the weight data collection module 125B are operative to manage authentication of each subject, acquire weight data for the subject, and store the weight data in association with the subject. More particularly, the subject places his finger on the biometric scanner sensor 152, where it is imprinted or scanned to acquire a log in image. The log in image may be programmatically preprocessed as needed. The log in image is programmatically compared to the identification database 125A to identify the stored subject template that matches the log in image and the subject name correlated to the template in the identification database 125A. For example, the controller 120 may refer to a lookup table to identify the subject name corresponding to the template.

Figure 11:
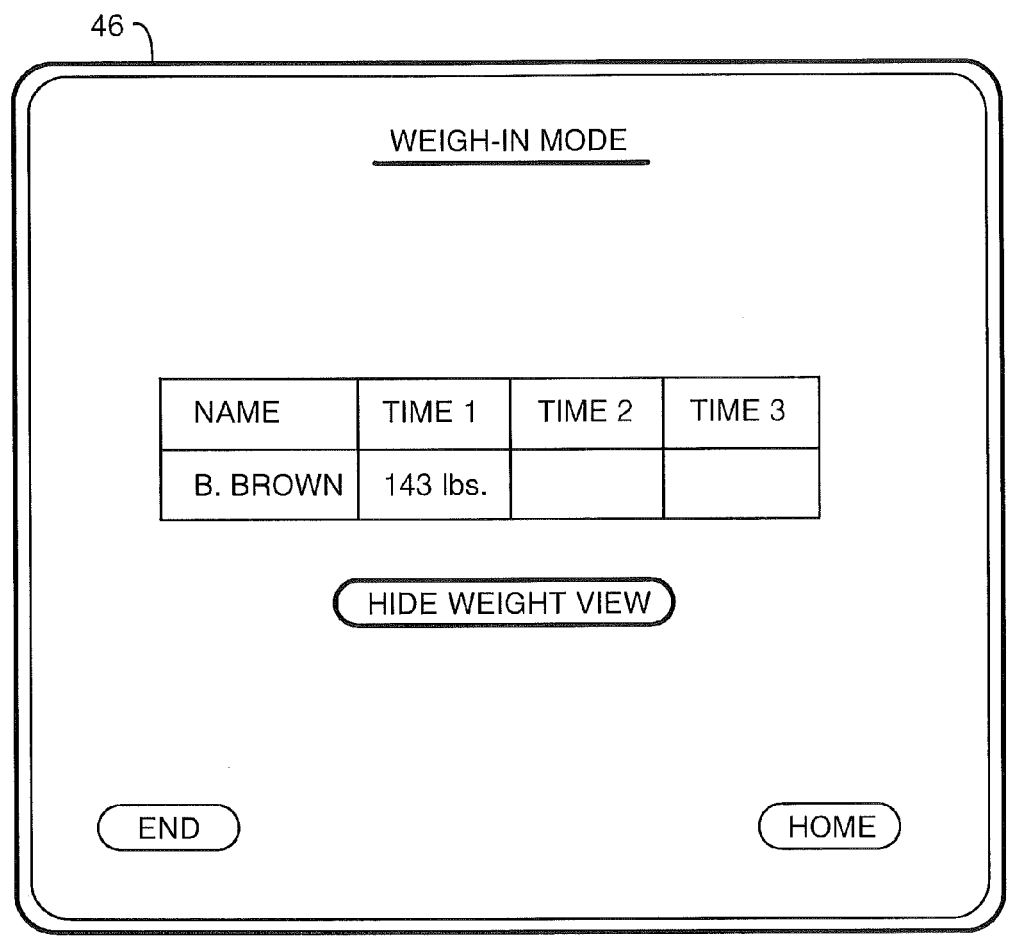

The subject steps on the scale 140 and is weighed. The weight data or value from the scale 140 is sent to the controller 120, which, using the weight data collection module 126D programmatically indexes the weight value to the subject name and the designated time of the weigh-in session, and saves the indexed value to the weight database 125B. That is, the weight value is associated with the subject at the designated time point. According to some embodiments, the data is auto-saved and can only be deleted by an administrator's command and/or automatically after a time period specified by the administrator (e.g., 365 days). Optionally, the controller 120 may report the weight and subject identification to the administrator (e.g., via the terminal 20 or the HMI 160) at this time via a WEIGH-IN MODE screen 46 as illustrated in FIG. 11. The controller 120 may provide an indication to the subject via the HMI 160 that the weigh-in has been successfully completed.

The foregoing steps may be executed for any number of subjects in series for the remainder of the weigh-in session. Accordingly, the controller 120 will modify the weight database 125B to include weight data for each of the subjects, wherein the weight value for each subject is associated with the subject at the designated time point.

The controller 120 may automatically reset after each successful weigh-in, each time a new biometric scan image is received from the scanner 150, or in response to a command from the administrator or a subject.

Figure 7:
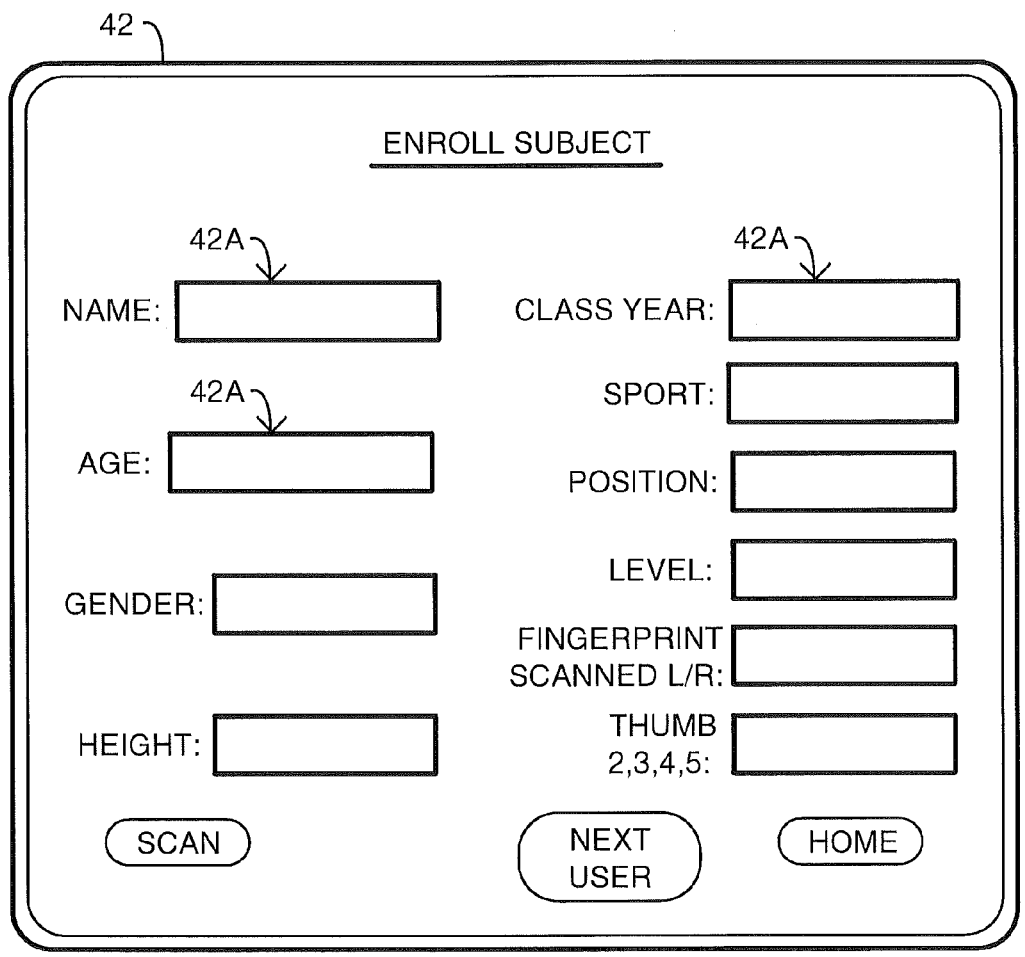

The administrator may thereafter end the weigh-in session by selecting "END" on the READY MODE screen 44 (FIG. 7). On this screen, the administrator can also initiate a new weigh-in session (hereinafter referred to as the "second weigh-in session") by setting a new time and date (time point) and selecting "START".

During the second weigh-in session, the subjects weighed (and for whom weight data was logged) in the first weigh-in session are again processed in the same manner as described above for the first weigh-in session (i.e., biometrically scanned, biometrically authenticated and identified, weighed, weight data indexed and stored for the subject at the designated time point). Accordingly, the controller 120 will modify the weight database 125B to include weight data for each of the subjects, wherein the weight value for each subject is associated with the subject at the second designated time point.

The foregoing procedure may be executed as many times as desired or within the design limits of the system 10. For example, weight data may be collected and stored for a third weigh-in session, a fourth weigh-in session, etc.

Figure 12:
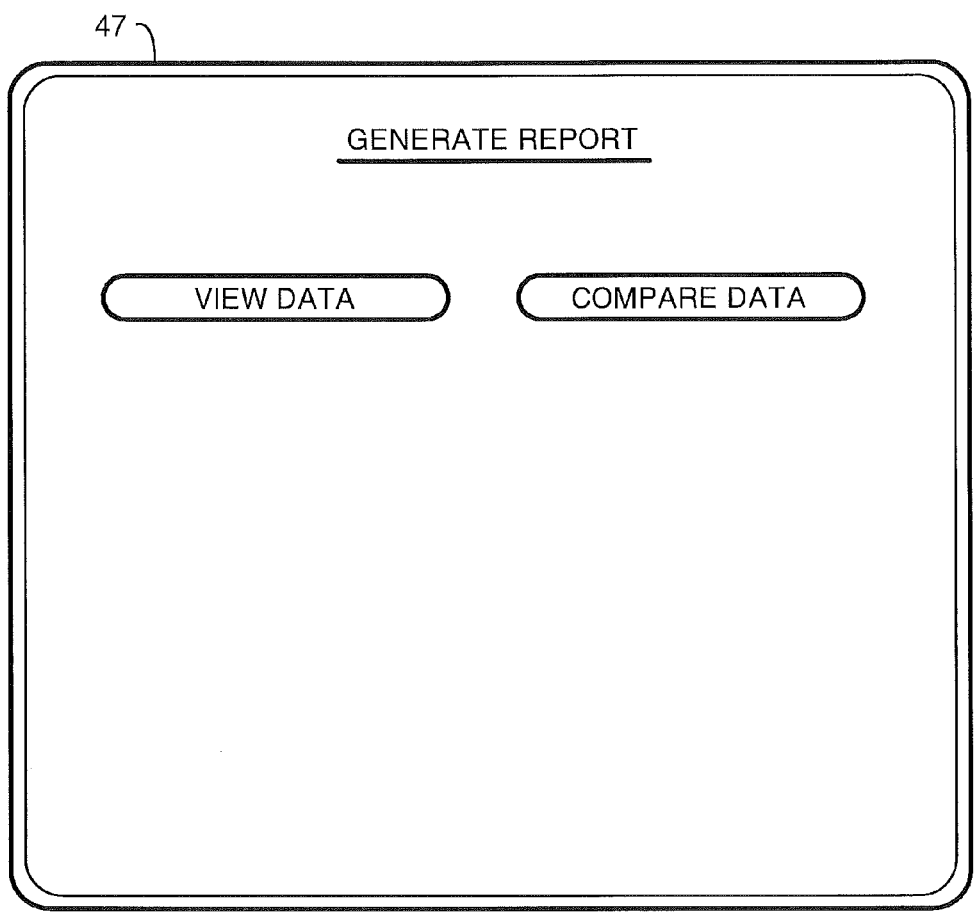
Figure 13:
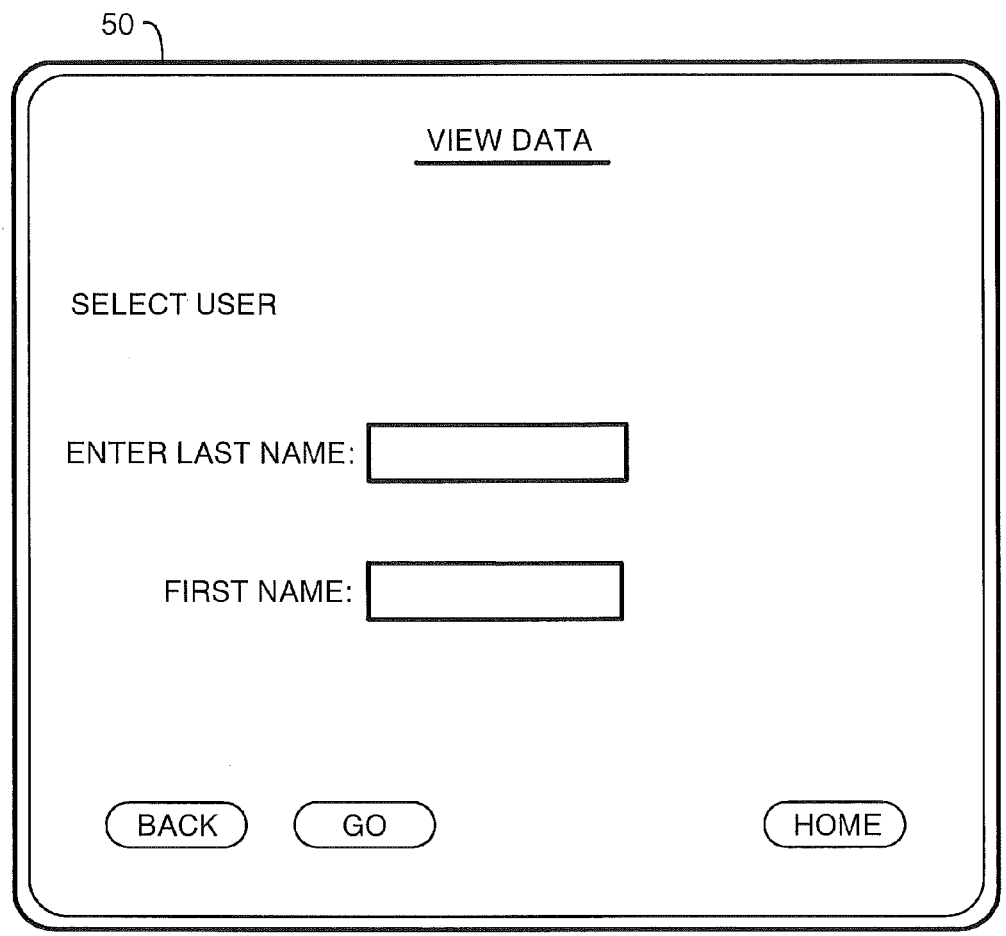
Figure 15:
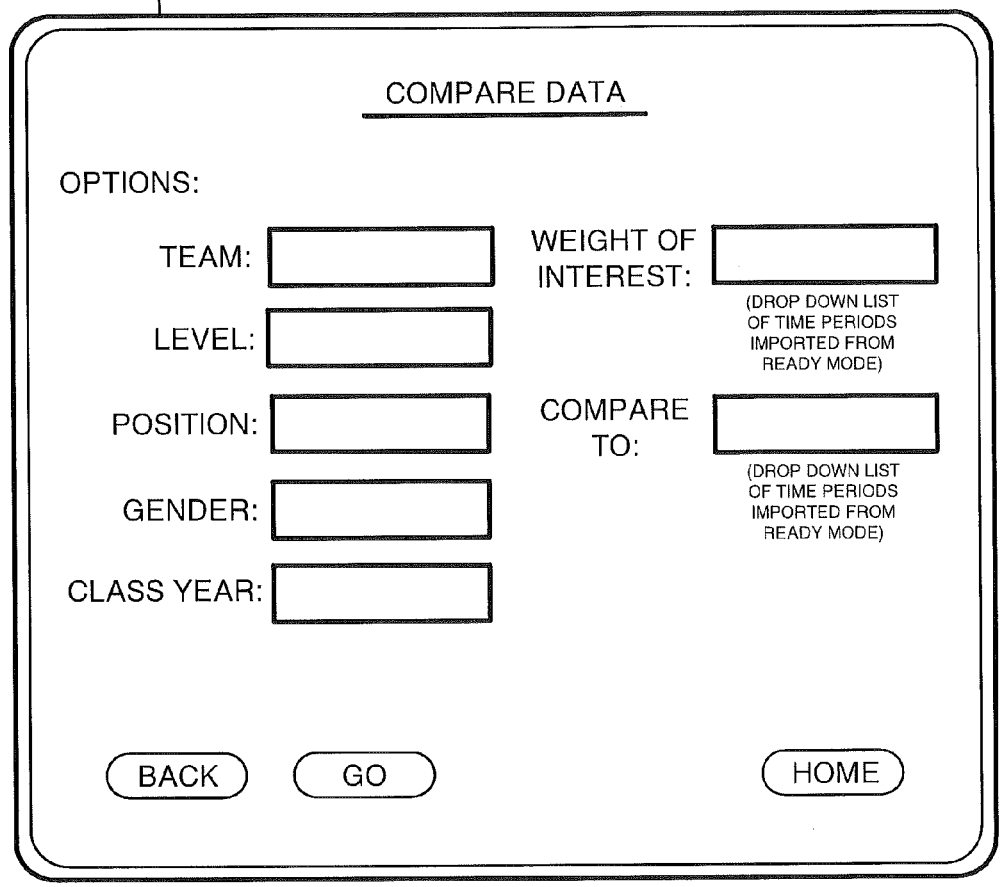
Figure 16:
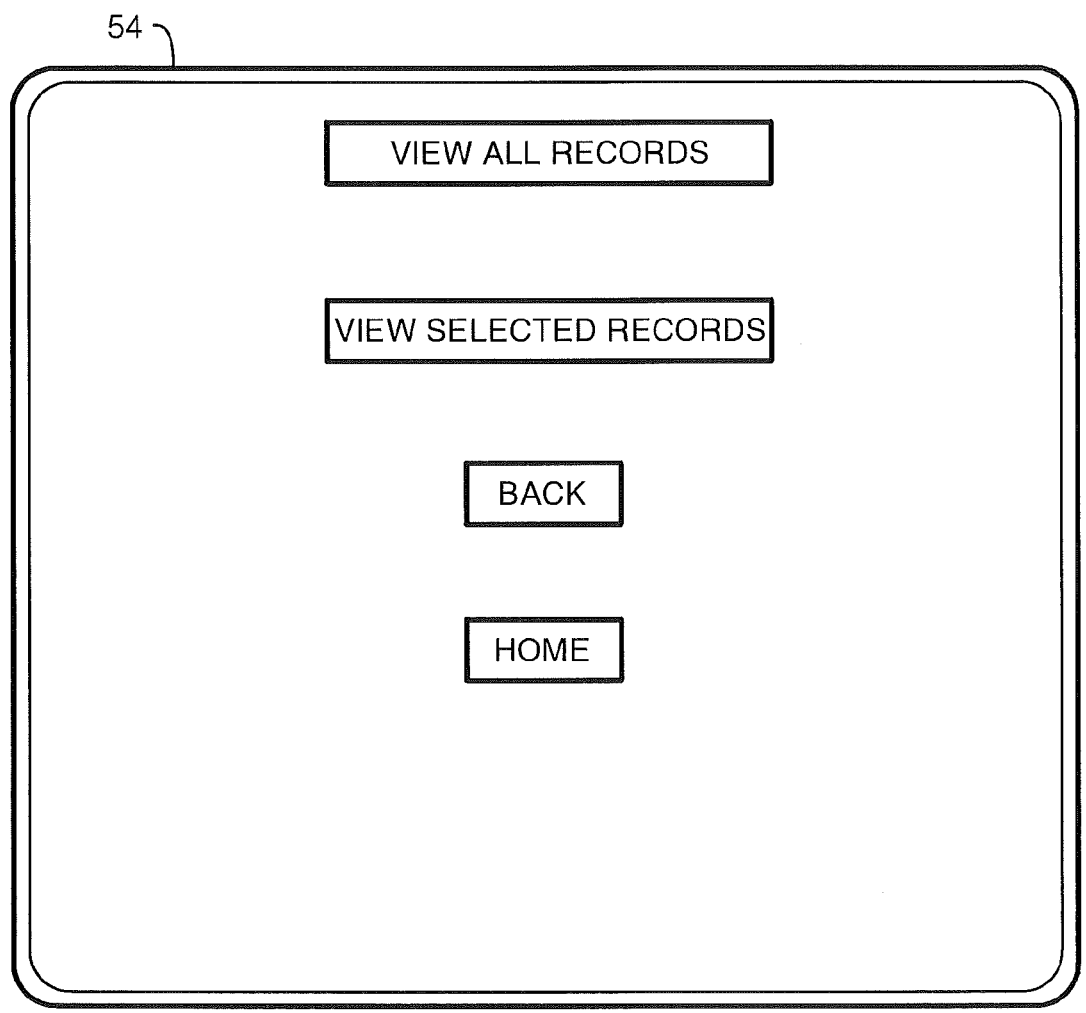
Figure 17:
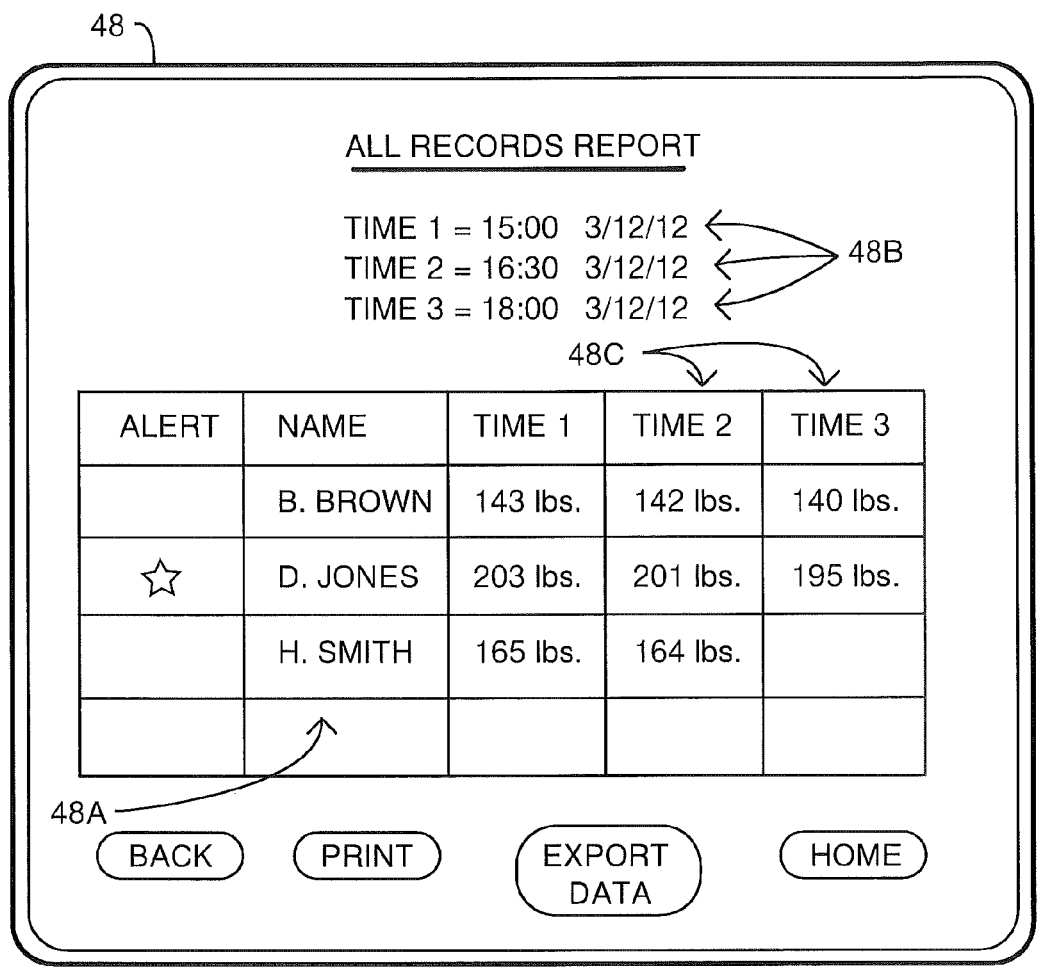

When desired, the administrator can obtain a report of the weigh-in data from the weight database 125B. Upon selecting "GENERATE REPORT" on the HOME screen 40, the controller 120, using the reporting module 126E will electronically generate a report. In order to generate the report, the reporting module 126E programmatically compiles and formats the identification and weight data from the weight database 125B. According to some embodiments, the data is reported in a spreadsheet format as illustrated in FIG. 17, for example; however, any suitable format may be used. According to some embodiments, the administrator can select from different criteria and formats for reported data. Upon selecting "GENERATE REPORT" on the HOME screen 40, the controller 120 will generate the screen 47 of FIG. 12. The administrator can select "VIEW DATA" to invoke screen 50 of FIG. 13. The administrator can enter the name of a selected subject to pull up a screen 50A (FIG. 14). The administrator may also select "COMPARE DATA" on screen 47 (FIG. 12), responsive to which the controller 120 may generate screen 52 (FIG. 15). Upon entering search criteria, the administrator may be given the opportunity to view selected or corresponding records (screen 54; FIG. 16). If "VIEW ALL RECORDS" is chosen, the controller 120 may generate screen 48 as shown in FIG. 17 including a report. According to some embodiments, the report includes, for each subject: the subject's name (or other suitable identifier) 48A; the designated time points of the weigh in sessions 48B; and the recorded weight 48C for each subject during each weigh in session time point. According to some embodiments, the report can be customized by the administrator and/or the administrator can select from multiple different types of reports. The administrator can select "EXPORT DATA" to invoke a screen 56 (FIG. 18) with options for outputting the report.

Figure 19:
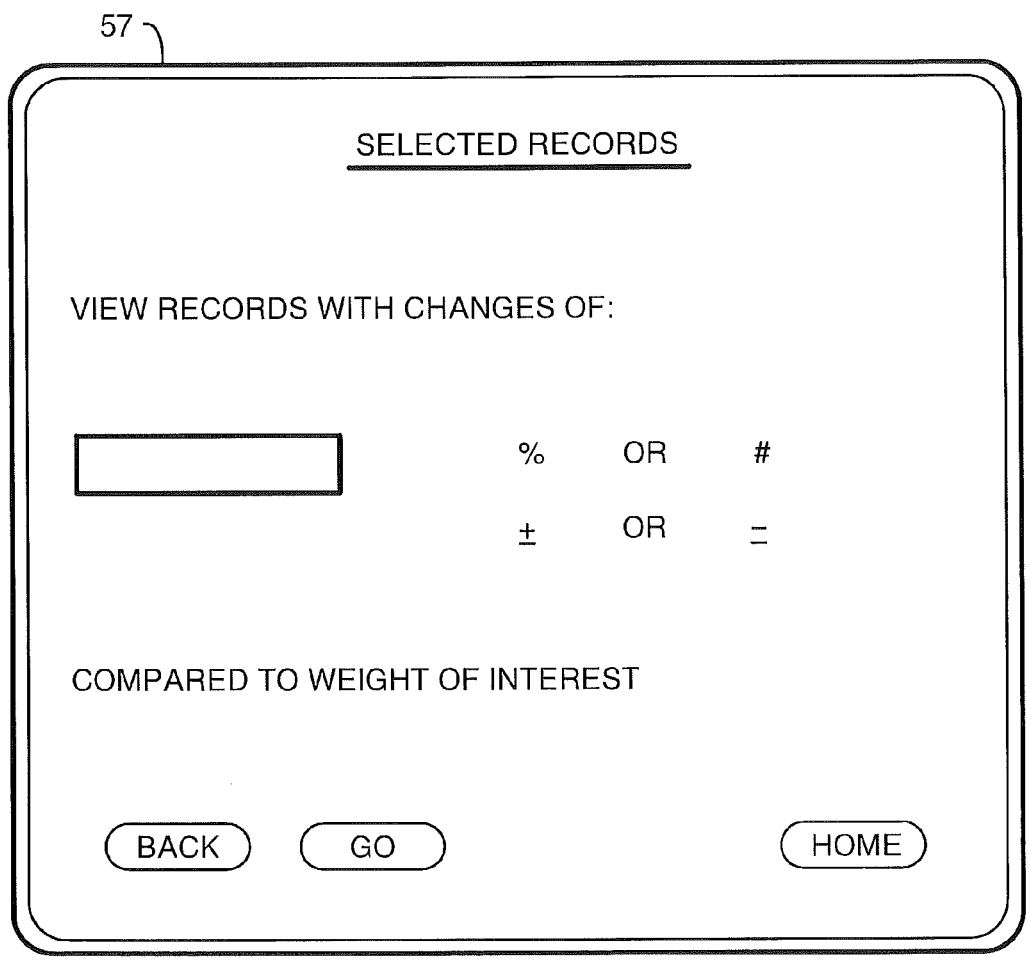
Figure 20:
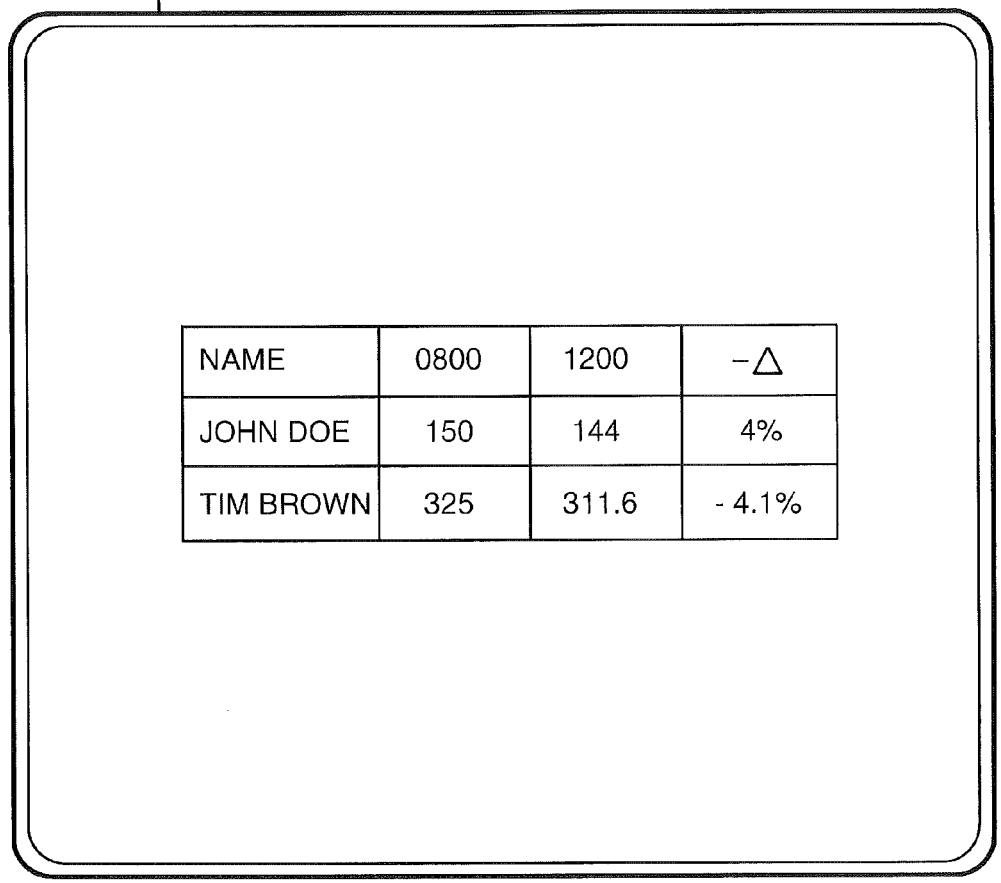

Alternatively, the administrator can select "VIEW SELECTED RECORDS" from screen 54 (FIG. 16) to invoke screen 57 (FIG. 19). The administrator can then enter further search or filtering criteria, responsive to which the controller 120 can compile and generate a corresponding report as illustrated in screen 58 (FIG. 20).

As will be readily appreciated, the report can present the weight data in a manner that readily lends itself to comparison. For example, the administrator can compare weights for a given subject at different weigh-in sessions.

According to some embodiments, the controller 120 programmatically identifies weights or subjects that satisfy prescribed criteria and notifies the administrator of the same. For example, according to some embodiments, the controller 120 analyzes the weight data and identifies any subjects whose recorded weight changed in a manner exceeding a prescribed threshold. In particular, the controller 120 may identify subjects whose recorded weight loss between on weigh-in session and a subsequent weigh-in session is greater than a prescribed threshold. The system 10 may notify the administrator of this event by highlighting the subject in a requested report (e.g., as illustrated by the star in FIG. 9) and/or by issuing a special alert even in the absence of a report request. For example, according to some embodiments, the system 10 will issue a visual and/or audible alert from the HMI 160, the HMI 170, and/or the administrator terminal 20.

The report (or the data therein and/or raw data from the weight database 125B) may be provided to the administrator in any desired manner. For example, the report or data may be displayed on the display 24, saved on an external data storage device (e.g., a thumb drive) or another computer device via the connector 176 or a connector of the terminal 20, or printed.

The system 10 as described above may be modified in various ways. For example, the local administrator HMI 160 may be expanded or reduced (e.g., with no user input device 164).

Methods and apparatus according to embodiments of the present invention can provide significant advantages. Systems and methods as disclosed herein can be particularly beneficial in assessing hydration of athletes by virtue of assessing weight loss during exercise. Excessive weight loss indicates hydration loss and renders an athlete unsafe to re-engage in exertion until re-hydration occurs. In the absence of supervised weigh-ins, athletes are unmonitored and are at very high risk for fatal effects of dehydration and heat stroke. Therefore, mandatory pre- and post- practice weigh-ins may be desirable or even required in some sports or jurisdictions. Yet, logistical hurdles and cumbersome data impede adherence to such recommendations. In many settings (e.g., in a high school athletic setting), recording athletes' weights can be very challenging as it is laborious to watch a large number of players (e.g., one hundred or more) weigh in, find their names in a spreadsheet, and then correctly type in weights. This routine typically must be repeated again at the end of practice, and each day following. Pre- and post-weights then have to be analyzed for differences and if differences are significant (i.e., exceed specified amounts), athletes must be "flagged" and given special instructions. Lines may become long, causing players to become impatient and skip weigh-ins. An administrator (e.g., an athletic trainer or a coach) is stuck "manning" the weigh-ins, consuming his/her time in an unproductive way.

Particular applications contemplated for use of the systems and methods of the present invention include weigh-ins of student (e.g., high school) football players and soccer players, which may include multiple tracked weigh-ins for each player on a given day or practice session. Another use for the systems and methods is to decrease the burden associated with supervised weekly weigh-ins of wrestlers (typically an official requirement). Other anticipated users include fitness centers and commercial weight loss centers that track weight loss over time. Currently, these facilities typically monitor weight by manually entering data into a computer from a traditional body weight scale.

According to some embodiments, systems and methods as described herein are used to execute pre- and post-practice weigh-ins to document hydration loss of players in an outdoor sport such as football. According to some embodiments, systems and methods as described herein are used to execute prescribed or periodic (e.g., weekly) weigh-ins for wrestlers. According to some embodiments, systems and methods as described herein are used to execute long-term weight monitoring at facilities such as fitness centers or commercial weight loss programs (e.g., Weight Watchers).

In some embodiments, the console 110 is situated in an athletic training room, locker room, field house, or institutional athletic facility. As discussed herein, the console 110 may be sturdy and fixed (e.g., anchored) and/or of substantial weight so that it can withstand abuse and resist unintended displacement or removal (e.g., theft).

The system 100 may be configured to have the capacity to store data for a great and essentially unlimited number of subjects (e.g., limited only by the memory capacity of the computer).

Systems and methods of the present invention can enable athlete verification and electronic data depositing. These features can eliminate the need for supervision of weigh-ins and human compilation of the data.

Referring again to FIG. 18, according to some embodiments, the system 10 can be used to electronically deposit or forward the weigh-in data to an external party database, terminal, or server (or servers) 80 (hereinafter "server 80"; FIG. 3). The controller 120 may be networked to the server 80 over the internet 30, for example.

The server 80 may be operated by, associated with or under the control of a third party, vendor, institution, or agency other than the administrator and the party, vendor, institution or agency controlling the system 10 (i.e., the server 80 is independent of the administrator and the system 10).

According to some embodiments, the server 80 is operated by an independent certification authority or vendor. In some embodiments, the server is operated by an independent sanctioning or governing body or agency (e.g., the National Collegiate Athletic Association (NCAA), National Association of Intercollegiate Athletics (NAIA), a state athletic association, etc.).

According to some embodiments, the server 80 is operated by a weight certification authority, firm, vendor or agency. Exemplary weight certification authorities or firms include the National Wrestling Coaches Association (NWCA) of Manheim, Pa., and the server 80 may be configured to provide a weight certification program and/or other services or algorithms for processing weigh-in data. Such weight certification programs, services and algorithms may include the NWCA Optimal Performance Calculator service offered by the NWCA (www.nwcaonline.com). Such weight certification programs, services and algorithms may include those described in U.S. Pat. No. 8,087,937 to Peplinski et al., the disclosure of which is incorporated herein by reference, for example.

Figure 18:
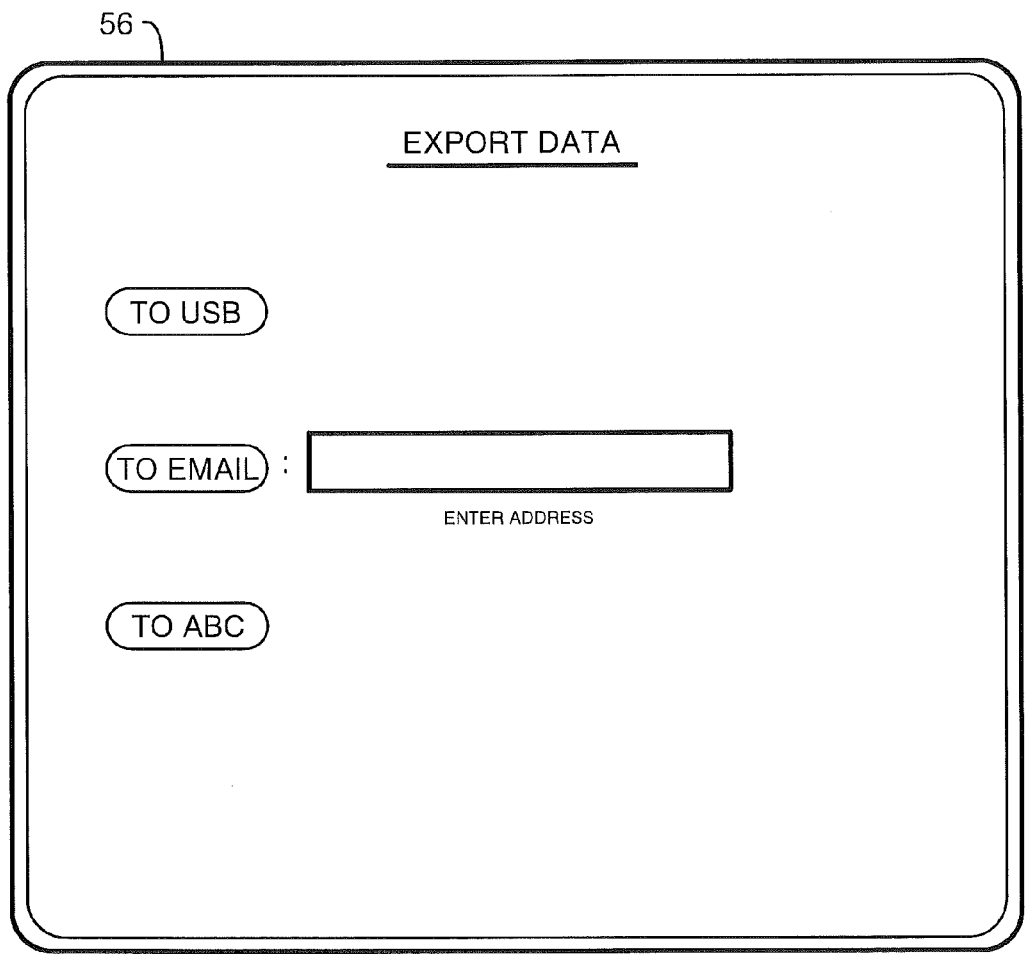

In use, the administrator can transmit and upload all or selected weigh-in data to the external server 80 by selecting "TO ABC" on the screen 56 (FIG. 18). It will be appreciated that "ABC" is merely an illustrative label and the "TO ABC" button may be labeled with the appropriate designation or name (e.g., "TO NWCA" in the event the external server 80 is operated by the NWCA).

The weigh-in data can be compiled and transmitted to the server 80 in any suitable format for reception and handling at the server 80. For example, the weigh-in data may be forwarded to the server 80 in a Microsoft Excel™ spreadsheet file. The system 10 may also enable the administrator to select which weigh-in data is transmitted to the server 80 (e.g., weigh-in data for only selected subjects, only selected weigh-in sessions, etc.) using further screens (not shown), for example.

In some embodiments, the weigh-in data sent to the server 80 as discussed above is or includes weigh-in data that may alternatively be entered individually using a web-based or online interface or portal operated by the operator of the server 80. By transferring this weigh-in data (which has been captured or stored by the weight data collection module 126D) to the server 80 using the reporting module 126E, the need to manually enter the data to the server 80 is avoided. Moreover, by transmitting the weigh-in data to the server 80 in a batch file, the weigh-in data can be efficiently and reliably correlated to the source (e.g., the school, administrator or coach providing or responsible for the supplied weigh-in data).

According to some embodiments, the weigh-in data is exported to the external server 80 as described above in order to comply with weight monitoring requirements for wrestlers as disclosed in U.S. Pat. No. 8,087,937. Thus, the weights of wrestlers collected on a first given or prescribed date by the system 10 may be exported to the server 80. The wrestlers' weights may be subsequently collected by the system 10 on a second given or prescribed date and exported to the server 80. The operator of the server 80 can collect, store and process the received weigh-in data to determine whether each wrestler's weight pattern is in compliance with the requirements of a governing body, and if so, may issue a certification indicating the same (and, if not, may notify the wrestler, administrator, coach and/or governing body). For example, the governing body may require that a wrestler's weight not drop more than a prescribed amount after a prescribed period. The wrestler's weight can be collected by the system 10 and reported to the server 80 during the prescribed period (e.g., before or at the beginning of the wrestling season) and during a subsequent prescribed period (e.g., later in the season), and processed by the operator of the server to determine, report and in some cases certify, whether the wrestler has lost more than the permitted weight.

Figure 21:
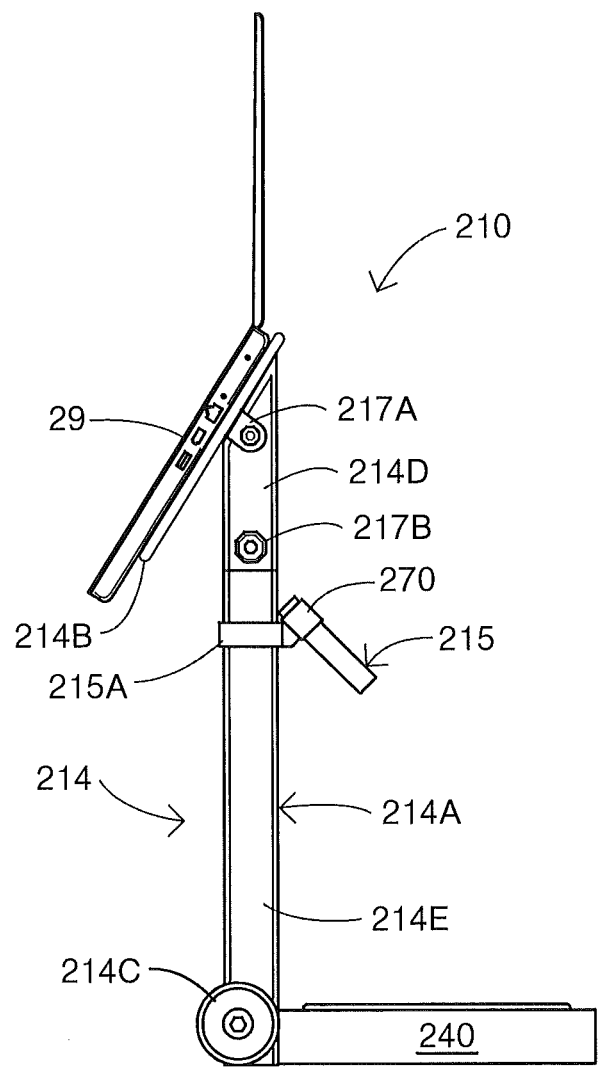
FIG. 21 is a side view of a weight monitoring console according to further embodiments of the present invention.

With reference to FIG. 21, an alternative console 210 according to embodiments of the invention is shown therein. The console 210 may be used and constructed in the same manner in the system 10 as the console 110, except as follows. The console 210 includes a pedestal-type stand or frame 214 having a post 214A, a platform 214B secured to the top of the post 214A, and rollers 214C at the bottom of the post 214A. The post 214A may be narrow (e.g., 2 to 6 inches in maximum width or diameter). A scale 240 corresponding to the scale 140 is located at the bottom of the post 214A and may be mounted on or serve as the supporting base of the stand 214. A user interface assembly 215 is coupled (e.g., by a clamp 215A) to the post 214A facing away from the platform 214B, for example. A biometric identification input device 250 corresponding to the device 150 and a display 270 corresponding to the display 170 are provided in the assembly 215. An administrator terminal 29 corresponding to the administrator terminal 20 is mounted on the platform 214B and may be a laptop computer or other mobile computing device, for example. Cabling between the terminal 29, the scale 240 and the user assembly 215 may be routed through the post 214A.

The console 210 may be moved about using the rollers 214C. A hinge 217A is provided for adjustment of the tilt angle of the platform 214B. The post 214 can include two post sections 214D and 214E connected for relative rotation about the vertical axis of the post 214A to permit a user to adjust the direction in which the terminal 29 faces. A control knob 217B can be used to secure the rotational position. Other position adjustment mechanisms may be provided, such as a platform height adjustment.

It is noted that any one or more aspects or features described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth herein.

The foregoing is illustrative of the present invention and is not to be construed as limiting thereof. Although a few exemplary embodiments of this invention has been described, those skilled in the art will readily appreciate that many modifications are possible in the exemplary embodiments without materially departing from the novel teachings and advantages of this invention. Accordingly, all such modifica- That which is claimed is:

1. A weight monitoring system comprising:
   a biometric identification input device;
   a body weight scale; and
   a controller operative to;
      enroll a plurality of subjects, including acquiring and storing biometric and biographical identification data for each of the plurality of subjects;
      thereafter, for each of the plurality of subjects;
         authenticate and identify the subject using identification data acquired by the biometric identification input device:
         store multiple weight values acquired by the body weight scale for the subject at different designated weigh-in time points, and correlate the weight data with the subject;
         index each of the multiple weight values to its corresponding weigh-in time point;
      programmatically analyze the weight data to determine and identify subjects who have lost more weight than a prescribed threshold weight loss between a first weigh-in time point of the subject and a subsequent weigh-in time point of the subject; and
      programmatically report the identification(s) of the subject(s) who have lost more weight than the prescribed threshold weight loss between a first weigh-in time point of the subject and a subsequent weigh-in time point of the subject, including issuing a visual and/or audible alert.

2. The weight monitoring system of claim 1 wherein the controller is operative, for each of the plurality of subjects, to automatically programmatically:
   authenticate and identify the subject using identification data acquired by the biometric identification input device;
   store multiple weight values acquired by the body weight scale for the subject at different designated weigh-in time points, and correlate the weight data with the subject;
   index each of the multiple weight values to its corresponding weigh-in time point.

3. The weight monitoring system of claim 1 wherein the biometric identification input device includes a biometric scanner adapted to scan and read each subject's fingerprint.

4. The weight monitoring system of claim 1 including a remote administrator terminal and/or an integrated human-machine interface.

5. The weight monitoring system of claim 1 including a console, wherein the biometric identification input device, the body weight scale, and the controller are integrated with the console.

6. The weight monitoring system of claim 1 further including a display.

7. The weight monitoring system of claim 1 wherein:
   the system includes an external server; and
   the controller is networked to the external server to enable the controller to export the weight data to the external server.

8. The weight monitoring system of claim 7 wherein the external server is operated by a weight certification authority.

9. A method for monitoring subjects' weights, the method comprising:
   providing a weight monitoring system including:
      a biometric identification input device;
      a body weight scale; and
      a controller; and
   using the controller:
      enrolling a plurality of subjects, including acquiring and storing biometric and biographical identification data for each of the plurality of subjects;
      thereafter, for each of the plurality of subjects:
         authenticating and identifying the subject using identification data acquired by the biometric identification input device;
         storing multiple weight values acquired by the body weight scale for the subject, and correlating the weight data with the subject;
         indexing each of the multiple weight values to its corresponding weigh-in time point;
      programmatically analyzing the weight data to determine and identify subjects who have lost more weight than a prescribed threshold weight loss between a first weigh-in time point of the subject and a subsequent weigh-in time point of the subject; and
      programmatically reporting the identification(s) of the subject(s) who have lost more weight than the prescribed threshold weight loss between a first weigh-in time point of the subject and a subsequent weigh-in time point of the subject, including issuing a visual and/or audible alert.

10. The weight monitoring system of claim 1 wherein the controller is operative to programmatically visually highlight, in a report, the identification(s) of the subject(s) who have lost more weight than the prescribed threshold weight loss between a first weigh-in time point of the subject and a subsequent weigh-in time point of the subject.

11. The weight monitoring system of claim 1 wherein the controller is operative to programmatically issue the visual and/or audible alert on a human machine interface in communication with the controller.

12. The weight monitoring system of claim 1 wherein the controller is operative to programmatically and automatically issue the visual and/or audible alert on the human machine interface in the absence of a report request from an administrator.

13. The method of claim 9 wherein:
   the subjects are athletes;
   the first weigh-in time point of each subject is executed before an athletic practice session; and
   the subsequent weigh-in time point of the subject is executed following the athletic practice session.

* * * * *